United States Patent

[11] 3,624,002

[72] Inventor William Novis Smith, Jr.
Exton, Pa.
[21] Appl. No. 811,247
[22] Filed Mar. 27, 1969
[45] Patented Nov. 30, 1971
[73] Assignee Foote Mineral Company
Ex, Pa.

[54] RELATIVELY CONCENTRATED SOLUTIONS OF LITHIUM ALKYL ALUMINATES AND THEIR PREPARATION
23 Claims, No Drawings

[52] U.S. Cl. ............................................. 252/431 R,
260/448 A
[51] Int. Cl. ............................................... C07f 5/06
[50] Field of Search ................................. 252/431;
260/448 A

[56] References Cited
OTHER REFERENCES

Nesmeyanov et al., Methods of Elemento-Organic Chemistry, Vol. 1, Pub by The World Publishing Co., Cleveland & New York (1967) pps. 399 & 447 most pertinent

*Primary Examiner* — Patrick P. Garvin
*Attorney* — Howson and Howson

ABSTRACT: Solutions of lithium alkylaluminates soluble in concentrations higher than 6 percent by weight are prepared by combining certain specific alkyl lithium compounds with certain specific trialkylaluminum compounds, dialkylaluminum hydrides or dialkylaluminum chlorides in the presence of an alkane solvent or a mixture of an alkane with up to about 66 percent of an aromatic hydrocarbon solvent.

3,624,002

RELATIVELY CONCENTRATED SOLUTIONS OF LITHIUM ALKYL ALUMINATES AND THEIR PREPARATION

BACKGROUND OF THE INVENTION

Lithium tetraalkylaluminates and lithium triaalkylhydridoaluminates (referred to generally herein as lithium alkylaluminates) are well known catalysts for the polymerization of olefins. These compounds generally have low solubility in aromatic hydrocarbon solvents and even lower solubility in aliphatic and alicyclic solvents.

Lithium alkylaluminates, and in particular lithium tetraalkylaluminates, are air sensitive solid or viscous liquid compounds; thus, it is highly desirable to handle and store them in hydrocarbon solutions, particularly aliphatic hydrocarbon solutions. Lithium alkylaluminates, such as lithium tetraalkylaluminates, known heretofore were prepared by reacting, in an ether or hydrocarbon solvent system, an alkyl lithium compound with a trialkylaluminum compound, wherein, usually, the alkyl portions of the two reactants were identical, e.g., decyllithium would be reacted with tridecylaluminum. In order to obtain a reasonably concentrated solution of the lithium tetraalkylaluminate in aliphatic hydrocarbons, each alkyl substituent contained nine or more carbon atoms. However, even with the use of reactants in which each alkyl group contained up to nine carbon atoms the solutions produced in aliphatic hydrocarbon solvents contained less than 6 percent, by weight, of the lithium tetraalkylaluminate.

It is also obvious that the use of reactants containing alkyl groups greater than nine carbon atoms is relatively expensive and that a procedure utilizing lower molecular weight, and less expensive, reactants would be desirable.

In another known procedure, lithium tetraalkylaluminates have been prepared by reacting lithium aluminum hydride with a large excess of a terminal vinyl olefinic hydrocarbon such as described in U.S. Pat. No. 2,873,290. This method is relatively expensive and thus undesirable. U.S. Pat. No. 3,030,398 relates to bimetallic organic compounds of an alkali metal and aluminum in which one of the organic moieties is cyclopentadienyl. U.S. Pat. No. 3,020,298 relates to similar compounds in which one of the organic moieties is acetylenic, and U.S. Pat. No. 3,068,261 requires an alkali metal-boron tetrahydrocarbon complex as a reactant.

DESCRIPTION OF THE PREFERRED EMBODIMENTS

This invention relates to the production of concentrated solutions of certain specific lithium alkylaluminates.

As stated above, lithium alkylaluminates are well-known catalysts for the polymerization of olefins. Consequently, there is a need for a method whereby concentrated solutions of lithium alkylaluminates can be prepared efficiently and at low cost, in aliphatic hydrocarbon solvents.

Accordingly, it is the object of this invention to prepare concentrated solutions of certain specific lithium alkylaluminates in hydrocarbon solvent systems. It is also an object of this invention to prepare the hydrocarbon solutions of lithium alkylaluminates in an efficient and relatively inexpensive manner.

In accordance with the present invention certain specific alkyl lithium compounds are reacted with certain specific trialkylaluminum compounds, dialkylaluminum hydrides, or dialkylaluminum chlorides, the alkyl groups of the lithium alkyl and of the aluminum alkyl compounds being selected so as to provide a product having two or more different alkyl groups (except where the alkyl group is branched in the 2-position and contains six or more carbon atoms in which case all alkyl groups may be the same) and to provide a product having at least 12 carbon atoms. In addition, no more than one hydrogen atom is attached to the aluminum atom in the product. This reaction takes place in an open chain alkane or cyclic alkane hydrocarbon solvent or in a mixture of such a solvent with up to about 66 percent of an aromatic hydrocarbon solvent.

These reactions proceed according to the following equations:

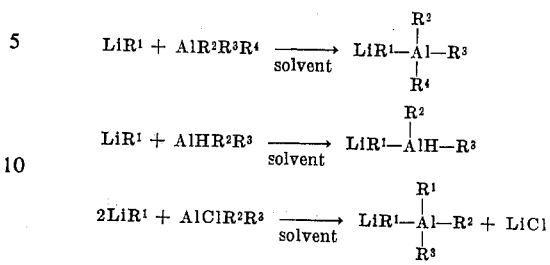

wherein $R^1$, $R^2$, $R^3$ and $R^4$ are entirely saturated alkyl groups containing from two to 12 carbon atoms. The equivalent of two R's may bond to the aluminum to form a cyclic lithium tetraalkylaluminate.

It has been found that certain specific alkyl lithium compounds may be combined, in the defined solvent system, with certain specific trialkylaluminum compounds, dialkylaluminum hydrides or dialkylaluminum chlorides to provide a lithium tetraalkylaluminate or lithium trialkylhydridoaluminate product which is soluble in the defined solvent system in which the reaction takes place to an extent of at least 6 percent and up to as much as 25 percent or more by weight.

The specific alkyl lithium compounds and trialkylaluminum compounds, dialkylaluminum hydrides, or dialkylaluminum chlorides which can be combined to provide the highly soluble lithium tetraalkylaluminates or lithium trialkylhydridoaluminates may be classified in the following groups:

A. n-alkyllithium compounds containing from two to 10 carbon atoms reacted with isoprenylaluminum to form the corresponding lithium n-alkyl isoprenylaluminates.

B. Alkyllithium compounds containing from two to six carbon atoms reacted with tri-n-decylaluminum to form the corresponding lithium alkyl tri-n-decylaluminates.

C. n-alkyllithium compounds containing from eight to 12 carbon atoms reacted with triisobutylaluminum to form the corresponding lithium n-alkyl triisobutylaluminates.

D. 2-alkyl-branched alkyl-1-lithium compounds containing from four to 10 carbon atoms reacted with a tri-n-alkylaluminum compound wherein each alkyl group contains from six to 10 carbon atoms to form the corresponding lithium 1-(2-alkyl-branched-alkyl) tri-n-alkylaluminates having the formula $LiR^1AlR^2R^3R^4$ wherein $R^1$ is a 2-alkyl-branched alkyl group containing from four to 10 carbon atoms and wherein each of $R^2$, $R^3$ and $R^4$ is an n-alkyl group containing from six to 10 carbon atoms.

E. Alkyllithium compounds containing from two to 10 carbon atoms reacted with a tri-1[2-alkyl-branched] alkyl aluminum in which each 2-alkyl-branched alkyl group contains from six to 12 carbon atoms to form the corresponding lithium alkyl tri-1[2-alkyl-branched-alkyl] aluminate having the formula $LiR^1AlR^2R^3R^4$ Wherein $R^1$ is an alkyl group containing from two to 10 carbon atoms and wherein each of $R^2$, $R^3$ and $R^4$ is a 1-(2-alkyl-branched-alkyl) group containing from six to 12 carbon atoms.

F. 2-alkyl-branched-alkyl-1-lithium compounds containing from four to 10 carbon atoms reacted with a di-1-(2-alkyl-branched-alkyl) aluminum hydride in which each 1-(2-alkyl-branched-alkyl) group contains four to 12 carbon atoms to form the corresponding lithium 1[2alkyl-branched-alkyl] [di-1-(2alkyl-branched-alkyl)]hydridoaluminate of the formula $LiR^1AlHR^2R^3$ wherein $R^1$ is a 1-[2-alkyl-branched-alkyl] group containing from four to 10 carbon atoms and wherein each of $R^2$ and $R^3$ is a 1-(2-alkyl-branched-alkyl) group containing from four to 12 carbon atoms.

G. n-alkyllithium compounds containing from six to 10 carbon atoms reacted with a di-1-(2-alkyl-branched-alkyl) aluminum hydride in which each 1-(2-alkyl-branched-alkyl) group contains four to 12 carbon atoms to form the corresponding lithium n-alkyl di-1-(2-alkyl-branched-alkyl) hydridoaluminate of the formula LiR¹AlHR²R³ wherein R¹ is an n-alkyl group containing from six to 10 carbon atoms and wherein each of R² and R³ is a 1-(2-alkyl-branched-alkyl) group containing from four to 12 carbon atoms.

H. Two moles of 2-alkyl-branched-n-alkyl-1-lithium compounds containing from six to 10 carbon atoms reacted with 1 mole of di-1-(2-alkyl-branched-alkyl) aluminum chloride wherein each 1-(2-alkyl-branched-alkyl) group contains from four to 12 carbon atoms to form the corresponding lithium [di-1-(2-alkyl-branched-alkyl) (each 2-alkyl-branched alkyl group containing from six to 10 carbon atoms)] [di-1-(2-alkyl-branched-alkyl) (each 2-alkyl-branched-alkyl group containing from four to 12 carbon atoms)] aluminate having the formula LiR¹AlR¹R²R³ wherein each R¹ is a 1-(2-alkyl-branched-alkyl) group containing from six to 10 carbon atoms and wherein each of R² and R³ is a 1-(2-alkyl-branched-alkyl) group containing from four to 12 carbon atoms.

In group A above, the n-alkyllithium compounds reacted with isoprenylaluminum include ethyl lithium, n-propyl lithium, n-butyl lithium, n-pentyl lithium, n-hexyl lithium, n-heptyl lithium, n-octyl lithium, n-nonyl lithium and n-decyl lithium.

In group B above, alkyllithium compounds including ethyl lithium, propyl lithium, butyl lithium, pentyl lithium, and hexyl lithium, 2-methyl-propyllithium, 2-methyl-butyllithium, 2-ethyl-propyllithium, 2-methyl-pentyllithium, and 2-ethyl-butyllithium; secondary alkyllithium compounds such as isopropyllithium, sec-butyllithium, sec-pentyllithium and cyclo-hexyllithium; tertiary alkyllithium compounds such as tert-butyllithium and tert-amyllithium; are reacted with tri-n-decylaluminum to form the corresponding lithium alkyl tri-n-decylaluminates.

In group C above, the n-alkyllithium compounds reacted with triisobutylaluminum include n-octyllithium, n-nonyllithium, n-decyllithium, n-undecyllithium and n-dodecyllithium.

In group D above, 2-alkyl-branched-alkyl-1-lithium compounds including isobutyllithium, 2-methylpropyl-1-lithium, 2-methylbutyl-1-lithium, 2-ethylpropyl-1-lithium, 2-methylpentyl-1-lithium, 2-ethylbutyl-1-lithium, 2-methylhexyl-1-lithium, 2-ethyl-pentyl-1-lithium, 2-propylbutyl-1-lithium, 2-methylheptyl-1-lithium, 2-ethylhexyl-1-lithium, 2-propylpentyl-1-lithium, 2-methyloctyl-1-lithium, 2-ethylheptyl-1-lithium, 2-propylhexyl-1-lithium, 2-butylpentyl-1-lithium, 2-methylnonyl-1-lithium, 2-ethyl-octyl-1-lithium, 2-propylheptyl-1-lithium, and 2-butylhexyl-1-lithium are reacted with tri-n-alkylaluminum compounds including tri-n-hexylaluminum, tri-n-heptylaluminum, tri-n-octylaluminum, tri-n-nonylaluminum and tri-n-decylaluminum to form lithium 1-[2-alkyl-branched-alkyl] tri-n-alkylaluminates.

In group E above, alkyllithium compounds including ethyllithium, n-propyllithium, n-butyllithium, n-pentyllithium, n-hexyllithium, n-heptyllithium, n-octyllithium, n-nonyllithium, n-decyllithium, sec-amyllithium, sec-butyllithium, isopropllithium, cyclohexyllithium, tert-butyllithium, 2-methylpropyl-1-lithium, 2-methylbutyl-1-lithium, 2-ethylpropyl-1-lithium, 2-methylpentyl-1-lithium, 2-ethylbutyl-1-lithium, 2-methylhexyl-1-lithium, 2-ethylpentyl-1-lithium, 2-propylbutyl-1-lithium, 2-methylheptyl-1-lithium, 2-ethylhexyl-1-lithium, 2-propylpentyl-1-lithium, 2-methyloctyl-1-lithium, 2-ethylheptyl-1-lithium, 2-propylhexyl-1-lithium, 2-butylpentyl-1-lithium, 2-methylnonyl-1-lithium, 2-ethyloctyl-1-lithium, 2-propylheptyl-1-lithium and 2-butylhexyl-1-lithium are reacted with tri-1-[2-alkyl-branched-alkyl] aluminum compounds including triisohexylaluminum, triios-heptylaluminum triisooctylaluminum, triisononylaluminum, tri-isodecylaluminum, triisoundecylaluminum, and triisododecylaluminum to form lithium alkyl tri-1-[2-alkyl-branched-alkyl] aluminates.

In group F above, 2-alkyl-branched-alkyl-1-lithium compounds including 2-methylpropyl-1-lithium, 2-methylbutyl-1-lithium, 2-ethylpropyl-1-lithium, 2-methylpentyl-1-lithium, 2-ethylbutyl-1-lithium, 2-methylhexyl-1-lithium, 2-ethylpentyl-1-lithium, 2-propylbutyl-1-lithium, 2-methylheptyl-1-lithium, 2-ethylhexyl-1-lithium, 2-propylpentyl-1-lithium, 2-methyloc-tyl-1-lithium, 2-ethylheptyl-1-lithium, 2-propylhexyl-1-lithium, 2-butylpentyl-1-lithium, 2-methylnonyl-1-lithium, 2-ethyloctyl-1-lithium, 2-propylheptyl-1-lithium, and 2-butylhexyl-1-lithium are reacted with di-1-(2-alkyl-branched-alkyl)aluminum hydrides including di-1-(2-methylpropyl)aluminum hydride, di-1-(2-methyl-butyl)aluminum hydride, di-1-(2-ethylpropyl)aluminum hydride, di-1-(2-methylpentyl)aluminum hydride, di-1-(2-ethylbutyl)aluminum hydride, di-1-(2-methylhexyl)aluminum hydride, di-1-(2-ethylpentyl)aluminum hydride, di-1-(2-propylbutyl)aluminum hydride, di-1-(2-methylheptyl)aluminum hydride, di-1-(2-ethylhexyl)aluminum hydride, di-1-(2-propylpentyl)aluminum hydride, di-1-(2-methyloctyl)aluminum hydride, di-1-(2-ethylheptyl)aluminum hydride, di-1-(2-propylhexyl)aluminum hydride, di-1-(2-butylpentyl)aluminum hydride, di-1-(2-methylnonyl)aluminum hydride, di-1-(2-ethyloctyl)aluminum hydride, di-1-(2-propylheptyl)aluminum hydride, di-1-(2-butylhexyl)aluminum hydride, di-1-(2-methyldecyl)aluminum hydride, di-1-(2-ethylnonyl)aluminum hydride, di-1-(2-propyloctyl)aluminum hydride, di-l-(2-butylheptyl)aluminum hydride, di-1-(2-pentyl-hexyl)aluminum hydride, di-1-(2-methylundecyl)aluminum hydride, di-1-(2-ethyldecyl)aluminum hydride, di-1-(2 -propylnonyl)aluminum hydride, di-1-(2-butyloctyl)aluminum hydride, and di-1-(2-pentyl-heptyl)aluminum hydride to form the corresponding lithium 1-[2-alkyl-branched-alkyl] [di-1-(2-alkyl-branched-alkyl)]' hydrido-aluminates.

In group G above, n-alkyllithium compounds including n-hexyllithium, n-heptyllithium, n-octyllithium, n-nonyllithium, and n-decyllithium are reacted with di-1-(2-alkyl-branched-alkyl) aluminum hydrides including di-1-(2-methylpropyl)aluminum hydride, di-1-(2-methylbutyl)aluminum hydride, di-1-(2-ethylpropyl)aluminum hydride, di-1-(2-methylpentyl)aluminum hydride, di-1-(2-ethylbutyl)aluminum hydride, di-1-(2-methylhexyl)aluminum hydride, di-1-(2-ethylpentyl)aluminum hydride, di-1-(2-propyl-butyl)aluminum hydride, di-1-(2-methylheptyl)aluminum hydride, di-1-(2-ethylhexyl)aluminum hydride, di-1-(2-propylpentyl)aluminum hydride, di-1-(2-methyloctyl)aluminum hydride, di-1-(2-ethylheptyl)aluminum hydride, di-1-(2-propylhexyl)aluminum hydride, di-1-(2-butylpentyl)aluminum hydride, di-1-(2-methyl-nonyl)aluminum hydride, di-1-(2-ethyloctyl)aluminum hydride, di-1-(2-propylheptyl)aluminum hydride, di-1-(2-butylhexyl)aluminum hydride, di-1-(2-methyldecyl)aluminum hydride, di-1-(2-ethyl-nonyl)aluminum hydride, di-1-(2-propyloctyl)aluminum hydride, di-1-(2-butylheptyl)aluminum hydride, di-1-(2-pentyhexyl)aluminum hydride, di-1-(2-methylundecyl)aluminum hydride, di-1-(2-ethyldecyl)aluminum hydride, di-1-(2-propylnonyl)aluminum hydride, di-1-(2-butyloctyl)aluminum hydride, and di-1-(2-pentyl-heptyl)aluminum hydride to form the corresponding lithium n-alkyl di-1-(2-alkyl-branched-alkyl)hydridoaluminate.

In group H above, 2-alkyl-branched-alkyl-1-lithium compounds including 2-methylpentyl-1-lithium, 2-ethylbutyl-1-lithium, 2-methylhexyl-1-lithium, 2-ethylpentyl-1-lithium, 2-propylbutyl-1-lithium, 2-methylheptyl-1-lithium, 2-ethylhexyl- 1-lithium, 2-propylpentyl-1-lithium, 2-methyloctyl-1-lithium, 2-ethylheptyl-1-lithium, 2-propylhexyl-1-lithium, 2-butylpentyl-1-lithium, 2-methylnonyl-1-lithium, 2-ethyloctyl-1-lithium, 2-propylheptyl-1-lithium, and 2-butylhexyl-1-lithium, are reacted with di-1-[2-alkyl-branched-alkyl]aluminum chlorides including di-1-(2-methylpropyl)aluminum chloride, di-1-(2-methylbutyl)aluminum chloride, di-1-(2-ethylpropyl)aluminum chloride, di-1-(2-methylpentyl)aluminum chloride, di-1-(2-ethylbutyl)aluminum chloride, di-1-(2-methylhexyl)aluminum chloride, di-1-(2-ethyl-pentyl)aluminum chloride, di-1-(2-propylbutyl)aluminum chloride, di-1-(2-methylheptyl)aluminum chloride, di-1-(2-ethylhexyl)-aluminum chloride, di-1-(2-propylpentyl)aluminum chloride, di-1-(2-methyloctyl)aluminum chloride, di-1-(2-ethylheptyl)alumuinum chloride, di-1-(2-propylhexyl)aluminum chloride, di-1-(2-butyl-pentyl)aluminum chloride, di-1-(2-methylnonyl)aluminum chloride, di-1-(2-ethyloctyl)aluminum chloride, di-1-(2-propylheptyl)-aluminum chloride, di-1-(2-butylhexyl)aluminum chloride, di-1-(2-methyldecyl)aluminum chloride, di-1-(2-ethylnonyl)aluminum chloride, di-1-(2-propyloctyl)aluminum chloride, di-1-( 2-butyl-heptyl)aluminum chloride, di-1-(2-pentylhexyl)aluminum chloride, di-1-(2-methylundecyl)aluminum chloride, di-1-(2-ethyldecyl)-aluminum chloride, di-1-(2-propylnonyl)aluminum chloride, di-1-(2-butyloctyl)aluminum chloride, and di-1-(2-pentylheptyl)-aluminum chloride to form the corresponding lithium di-1-(2-alkyl-branched-alkyl) di-1-(2-alkyl-branched-alkyl)' aluminate.

The solvents utilized in the present invention are alkanes (either open chain or cyclic), containing from four to 18 carbon atoms such as butane, pentane, hexane, heptane, octane, nonane, decane, undecane, dodecane, tridecane, tetradecane, pentadecane, hexadecane, heptadecane, octadecane, cyclobutane, cyclopentane, cyclohexane, cycloheptane, cyclo-octane, cyclononane, cyclodecane, cycloundecane, cyclododecane, cyclotridecane, cyclotetradecane, cyclopentadecane, cyclohexa-decane, cycloheptadecane, and cyclooctadecane. Especially preferred are those alkanes and cycloalkanes containing from five to seven carbon atoms. As indicated previously, mixtures of two or more of these alkanes or cycloalkanes may be utilized in the solvent system.

The presence of an aromatic solvent such as benzene, toluene, xylene, cumene, ethyl benzene and the like, increases the solubility of the lithium alkylaluminate, therefore a solvent mixture of the alkane or cycloalkane and up to as much as two-thirds of an aromatic solvent represents an especially desirable solvent system.

The reactants are preferably combined in the form of solutions, the solvents being the same or different for each reactant. Except as noted in group G above, the reactants are combined in a ratio of about 1 mole of the lithium reactant per 1 mole of the aluminum reactant, although in actual practice the proportions of the reactants used may vary slightly from the equal molar theoretical proportion.

The alkyl lithium compounds are reacted with the trialkylaluminum compounds, dialkylaluminum hydrides or dialkylaluminum chlorides in the form of relatively concentrated solutions in the solvents discussed above. Thus, the reactants are usually combined in the form of solutions each containing from about 5 percent and as much as 50 percent of the reactant. Commonly, the reactants are combined as solutions containing from about 15 to 30 percent of the reactant. Also, the solution of the trialkylaluminum compound, dialkylaluminum hydride, or dialkylaluminum chloride reactant is generally more concentrated than the solution of the alkyllithium reactant. It is also possible to add the alkylaluminum compound directly to the alkyllithium solution. Thus, when a particular alkyl lithium compound is reacted with the trialkylaluminum, dialkylaluminum hydride, or dialkylaluminum chloride in a solvent system as described above the resultant solution will contain at least 6 percent and up to as much as 25 percent or more by weight of the lithium tetraalkylaluminate.

Generally the temperature of the reaction between the alkyllithium solution and the trialkylaluminum, dialkylhydridoaluminum or dialkylaluminum chloride solution is between −10 and 80° C., preferably between 10° and 20° C. and atmospheric pressure is usually employed and preferred. The reaction is carried out in the substantial absence of water vapor, oxygen and carbon dioxide as by carrying out the reaction under an inert atmosphere such as dry nitrogen or argon.

This invention will be more completely illustrated by the following examples. In example I through XII the following general procedure was utilized:

A small serum bottle was fitted with a rubber serum stopper. The bottle was flushed with dry argon or nitrogen injected through a needle attached to tubing carrying the inert gas stream and using another needle as a vent. The inert gas needle was removed and an appropriate quantity of the trialkylaluminum compound, dialkylaluminum hydride, or dialkylaluminum chloride in solution was then added using a

TABLE I

| Examples | Alkyllithium reactant | | | Alkylaluminum reactant | | | | Lithium alkylaluminate product | Product concentrations, percent |
|---|---|---|---|---|---|---|---|---|---|
| | Identity | Moles | Solvent | Identity | Concentration, percent | Moles | Solvent | | |
| I | n-Butyllithium | 0.008 | Hexane | Tri-n-decyl-aluminum | 15 | 0.008 | Heptane | Lithium n-butyltri-n-decylaluminate | 19.3 |
| II | Sec-butyllithium | 0.008 | Cyclohexane | do | 12 | 0.008 | do | Lithium sec-butyltri-n-decylaluminate | 18.5 |
| III | Isobutyllithium | 0.008 | Hexane | do | 12.7 | 0.008 | do | Lithium isobutyltri-n-decylaluminate | 18.6 |
| IV | Decyllithium | 0.008 | Benzene | Triisobutyl-aluminum | 15 | 0.008 | Hexane | Lithium decyltriisobutylaluminate | 17.5 |
| V | 2-ethyl-1-butyllithium | 0.008 | Cyclohexane | Tri-n-hexyl-aluminum | 7.2 | 0.008 | do | Lithium 1-(2-ethylbutyl) tri-n-hexylaluminate | 13.8 |
| VI | 2-ethyl-1-hexyllithium | 0.008 | do | do | 23 | 0.008 | do | Lithium 1-(2-ethylhexyl) tri-n-hexylaluminate | 20.7 |
| VII | n-Butyllithium | 0.01 | Hexane | Tri-1-(2-methylpentyl) aluminum | 15 | 0.01 | Heptane | Lithium n-butyltri-1-(2-methylpentyl) aluminate | 18.4 |
| VIII | n-Hexyllithium | 0.024 | do | Diisobutyl-aluminum hydride | 15 | 0.024 | do | Lithium n-hexyldiisobutylhydridoaluminate | 19.6 |
| IX | 2-ethyl-1-butyllithium | 0.005 | do | do | 7.2 | 0.005 | do | Lithium 1-(2-ethylbutyl) diisobutylhydridoaluminate | 14.2 |
| X | Isobutyllithium | 0.009 | do | Tri-n-hexyl-aluminum | 12.7 | 0.009 | do | Lithium isobutyltri-n-hexylaluminate | 21.1 |
| XI | Ethyllithium | 0.012 | Benzene | Isoprenyl-aluminum | 4.8 | 0.012 | do | Lithium ethylisoprenylaluminate | 20.0 |
| XII | do | 0.009 | do | Tri-1-(2-methylpentyl) aluminum | 4.8 | 0.009 | do | Lithium ethyl-tri-1-(2-methylpentyl) aluminate | 17.5 | hypodermic syringe previously flushed with an inert gas. A molar equivalent amount of the alkyllithium compound in solution was then added using a hypodermic syringe previously flushed with an inert gas. The vent needle was then removed. The bottle was then shaken and allowed to stand 24 hours at 20° C. to determine whether the lithium alkylaluminate alkylhydridoaluminate was moderately soluble in the hydrocarbon solvent.

minum or 16.9 percent lithium n-butylisoprenylaluminum.

To illustrate the specificity with which the reactants must be selected to provide relatively concentrated lithium alkylaluminate solutions certain other alkyllithium and trialkylaluminum compounds were combined; however, the resulting products were not soluble in the aliphatic hydrocarbon solvents. Examples of such alkyl combinations, using the same procedure as in examples I–XII, are set forth in table II.

TABLE II

Insoluble $LiAlR^1R^2R^3R^4$

| Examples | Alkyllithium reactant | | | | Alkylaluminum reactant | | | | Product |
|---|---|---|---|---|---|---|---|---|---|
| | Identity | Moles | Solvent | Concentration, percent | Identity | Moles | Solvent | Concentration, percent | |
| XV | n-Butyllithium | 0.008 | Hexane | 15.0 | Triisobutyl-aluminum | 0.008 | Hexane | 20 | Heavy precipitate. |
| XVI | Cyclopentyllithium | 0.008 | Cyclohexane. | 23 | Isoprenyl-aluminum | 0.008 | ...do | 20 | Insoluble oil Separated. |
| XVII | ...do | 0.008 | ...do | 23 | Tri-n-butyl-aluminum | 0.008 | ...do | 20 | Heavy precipitate. |
| XVIII | Sec-butyllithium | 0.008 | ...do | 12 | ...do | 0.008 | ...do | 20 | Do. |
| XIX | Isobutyllithium | 0.008 | Hexane | 12.7 | ...do | 0.008 | ...do | 20 | Do. |
| XX | Bornyllithium | 0.008 | ...do | 9.2 | ...do | 0.008 | ...do | 20 | Do. |
| XXI | N-Butyllithium | 0.008 | ...do | 15 | Tri-n-heyl-aluminum | 0.008 | ...do | 20 | Do. |
| XXII | n-decyllithyium | 0.008 | Benzene | 15 | Tri-n-buty-aluminum | 0.008 | ...do | 20 | Moderate precipitate. |
| XXIII | n-Hexyllithium | 0.008 | Hexane | 15 | Triisobutyl-aluminum | 0.008 | ...do | 20 | Heavy precipitate. |
| XXIV | 2-ethyl-1-hexyllithium | 0.008 | Cyclohexane. | 23 | Tri-n-butyl-aluminum | 0.008 | ...do | 20 | Do. |
| XXV | ...do | 0.008 | ...do | 23 | Triisobutyl-aluminum | 0.008 | ...do | 20 | Do. |
| XXVI | n-Butyllithium | 0.024 | Hexane | 15 | Diisobutyl-aluminum hydride. | 0.024 | Heptane | 25 | Do |
| XXVII | n-Hexyllithium | 0.008 | ...do | 15 | Tri-n-hexyl-aluminum | 0.008 | Hexane | 20 | Do. |

EXAMPLE XIII

A 3-necked flask was equipped with a pressure-equalizing dropping funnel and stirrer and flushed with argon. A solution of 0.099 moles of 25 percent diisobutylaluminum chloride in heptane was added to the flask. A solution of 0.198 moles of 23 percent 2-ethylhexyl-1-lithium in cyclohexane was then added to the flask. During the addition of the 2-ethyl-1-hexyllithium the flask was cooled, maintaining a reaction temperature of 30° C. The lithium chloride precipitate was then removed by filtration, leaving a 22 percent solution of lithium diisobutyldi-1-(2-ethyl-1-hexyl)aluminate. The lithium and aluminum analyses of the solution agreed with the theoretical.

EXAMPLE XIV

A 3-necked flask was equipped with a pressure-equalizing dropping funnel, stirrer and thermometer and purged with dry nitrogen. The flask was then charged with 2.788 moles of 25 percent isoprenylaluminum in heptane and cooled to 5° C. (The concentration of the isoprenylaluminum was calculated on the basis of aluminum content. This material is prepared from isoprene and a trialkylaluminum or dialkylaluminum hydride, the alkyl moieties of which contain from two to six carbon atoms. The reaction between isoprene and the trialkylaluminum or dialkylaluminum hydride is not completely understood, however, a cyclic product having two carbons of the same alkyl bonded to the same aluminum to form a ring compounds results from the reaction. In this particular case it was prepared using triisobutylaluminum as the trialkylaluminum compound and has the formula

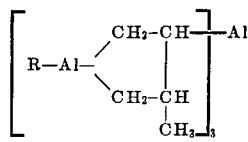

This material was obtained from Stauffer Chemical Company.) Then 713 g. of cyclohexane was added followed by the gradual addition of 2.788 moles of 14.85 percent n-butyllithium in cyclohexane over a 25 minute period at 5°. The clear solution was then bottled. Analysis showed 1.80 percent alu-

Having thus described this invention, What is claimed is:

1. A solution of a lithium alkylaluminate wherein said lithium alkylaluminate is present in a concentration of at least 6 percent and wherein the solvent for said solution is selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene wherein the lithium alkylaluminate is a member of the group consisting of:

A. lithium n-alkyl isoprenylaluminates wherein said alkyl group contains from two to 10 carbon atoms, B. lithium alkyl tri-n-decylaluminates wherein said alkyl group contains from two to six carbon atoms, C. lithium n-alkyl triisobutylaluminates wherein said alkyl group contains from eight to 12 carbon atoms, D. lithium 1-(2-alkyl-branched-alkyl) tri-n-alkyl-aluminates, of the formula $LiR^1AlR^2R^3R^4$, wherein $R^1$ is a 2-alkyl-branched-alkyl group containing from four to 10 carbon atoms and wherein each of $R^2$, $R^3$ and $R^4$ is an n-alkyl group containing from six to 10 carbon atoms, E. lithium alkyl tri-1-(2-alkyl-branched-alkyl) aluminates of the formula $LiR^1AlR^2R^3R^4$, wherein $R^1$ is an alkyl group containing from two to 10 carbon atoms and wherein each of $R^2$, $R^3$ and $R^4$ is a 1-(2-alkyl-branched-alkyl) group containing from six to 12 carbon atoms, F. lithium 1-[2-alkyl-branched-alkyl][1-(2-alkyl-branched-alkyl)]hydridoaluminates, of the formula $LiR^1AlHR^2R^3$, wherein $R^1$ is a 1-[2-alkyl-branched-alkyl] group containing from four to 10 carbon atoms and wherein each of $R^2$ and $R^3$ is a 1-(2-alkyl-branched-alkyl) group containing from four to 12 carbon atoms, and G. lithium n-alkyl-di-1-(2-alkyl-branched-alkyl)hydridoaluminate of the formula $LiR^1AlHR^2R^3$, wherein $R^1$ is an n-alkyl group containing from six to 10 carbon atoms and wherein each of $R^2$ and $R^3$ is a 1-(2-alkyl-branched-alkyl) group containing from four to 12 carbon atoms, and H. lithium [di-1-(2-alkyl-branched-alkyl)] [di-1-(2-alkyl-branched-alkyl)] aluminates, of the formula $LiR^1AlR^1R^2R^3$, wherein each $R^1$ is a 1-(2-alkyl-branched-alkyl) group containing from six to 10 carbon atoms and wherein each of $R^2$ and $R^3$ is a 1-(2-alkyl-branched-alkyl) group containing from four to 12 carbon atoms.

2. A solution of lithium n-alkyl isoprenylaluminate in a concentration of at least 6 percent in a solvent selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene, wherein the alkyl group of the lithium n-alkyl isoprenylaluminate contains from two to 10 carbon atoms.

3. A solution according to claim 2 wherein said lithium n-alkyl isoprenylaluminate is lithium ethylisoprenyl-aluminate.

4. A solution according to claim 2 wherein said lithium n-alkyl isoprenylaluminate is lithium n-butylisoprenyl-aluminate.

5. A solution of lithium alkyl tri-n-decylaluminate in a concentration of at least 6 percent in a solvent selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene, wherein the alkyl group of the lithium alkyl tri-n-decylaluminate contains from two to six carbon atoms.

6. A solution according to claim 5 wherein said lithium alkyl tri-n-decylaluminate is lithium n-butyltri-n-decylaluminate.

7. A solution according to claim 5 wherein said lithium alkyl tri-n-decylaluminate is lithium sec-butyltri-n-decylaluminate.

8. A solution according to claim 5 wherein said lithium alkyl tri-n-decylaluminate is lithium isobutyltri-n-decylaluminate.

9. A solution of lithium n-alkyl triisobutylaluminate in a concentration of at least 6 percent in a solvent selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene, wherein alkyl group of the lithium n-alkyl triisobutylaluminate contains from eight to 12 carbon atoms.

10. A solution according to claim 9, wherein said lithium n-alkyl triisobutylaluminate is lithium decyltriiso-butylaluminate.

11. A solution of lithium 1-(2-alkyl-branched-alkyl) tri-n-alkylaluminate, of the formula $LiR^1AlR^2R^3R^4$, in a concentration of at least 6 percent in a solvent selected from the group consisting of (a) alkanes containing from four to 18 carbon atoms, and (b) a mixture of at least one of said alkanes with up to about 66 percent of an aromatic solvent from the group consisting of xylene, toluene, benzene, cumene and ethyl benzene, wherein $R^1$ is a 2-alkyl-branched-alkyl group containing from four to 10 carbon atoms and wherein each of $R^2$, $R^3$ and $R^4$ is an n-alkyl group containing from six to 10 carbon atoms.

12. A solution according to claim 11 wherein said lithium 1-(2-alkyl-branched-alkyl) tri-n-alkylaluminate is lithium 1-(2-ethylbutyl) tri-n-hexylaluminate.

13. A solution according to claim 11 wherein said lithium 1-(2-alkyl-branched-alkyl) tri-n-alkylaluminate is lithium 1-(2-ethylhexyl) tri-n-hexylaluminate.

14. A solution according to claim 11 wherein said lithium 1-(2-alkyl-branched-alkyl) tri-n-alkylaluminate is lithium isobutyltri-n-hexylaluminate.

15. A solution of lithium alkyl tri-1-(2-alkyl-branched-alkyl) aluminate, of the formula $LiR^1AlR^2R^3R^4$, in a concentration of a least 6 percent in a solvent selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene, wherein $R^1$ is an alkyl group containing from two to 10 carbon atoms and wherein each of $R^2$, $R^3$ and $R^4$ is a 1-(2-alkyl-branched-alkyl) group containing from six to 12 carbon atoms.

16. A solution according to claim 15 wherein said lithium alkyl tri-1-(2alkyl-branched-alkyl) aluminate is lithium n-butyltri-1-(2-methylpentyl)aluminate.

17. A solution according to claim 15 wherein said lithium alkyl tri-1-(2-alkyl-branched-alkyl) aluminate is lithium ethyltri-1-(2-methylpentyl) aluminate.

18. A solution of lithium 1-[2-alkyl-branched-alkyl] [di-1-(2-alkyl-branched)] hydridoaluminate, of the formula $LiR^1AlHR^2R^3$, in a concentration of at least 6 percent in a solvent system selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene and ethyl benzene, wherein $R^1$ is a 1-[2alkyl-branched-alkyl] group containing from four to 10 carbon atoms and wherein each of $R^2$ and $R^3$ is a 1-(2-alkyl-branched-alkyl) group containing from four to 12 carbon atoms.

19. A solution according to claim 18 wherein said lithium 1[2-alkyl-branched-alkyl] [di-1-(2-alkyl-branched-alkyl)] hydridoaluminate is lithium 1-(2-ethylbutyl) diisobutyl-hydrido-aluminate.

20. A solution of lithium n-alkyl di-1-(2-alkyl-branched-alkyl) hydridoaluminate, of the formula $LiR^1AlHR^2R^3$, in a concentration of at least 6 percent in a solvent system selected from the group consisting of (a) alkanes containing from four to 18 carbon atoms, and (b) a mixture of at least one of said alkanes up to about 66 percent of an aromatic solvent selected from the group consisting of xylene, toluene, benzene, cumene, and ethyl benzene, wherein $R^1$ is an n-alkyl group containing from six to 10 carbon atoms and wherein each of $R^2$ and $R^3$ is a 1-(2-alkyl-branched-alkyl) group containing from four to 12 carbon atoms.

21. A solution according to claim 20 wherein said lithium n-alkyl-di-1-(2-alkyl-branched-alkyl)hydridoaluminate is lithium n-hexyldiisobutylhydridoaluminate.

22. A solution of lithium [di-1-(2-alkyl-branched-alkyl)] [di-1-(2-alkyl-branched-alkyl)] aluminates, of the formula $LiR^1AlRBH2R^3$, in a concentration of at least 6 percent in a solvent system selected from the group consisting of (a) alkanes containing from four to 18 carbon atoms, and (b) a mixture of at least one of said alkanes with up to about 66 percent of an aromatic solvent selected from the group consisting of xylene, toluene, benzene, cumene, and ethyl benzene, wherein each $R^1$ is a 1-(2-alkyl-branched-alkyl) group containing from six to 10 carbon atoms and wherein each of $R^2$ and $R^3$ is a 1-(2-alkyl-branched-alkyl) group containing from four to 12 carbon atoms.

23. A solution according to claim 22 wherein said lithium [di-1-(2-alkyl-branched-alkyl)][di-1-(2-alkyl-branched-alkyl)] aluminate is lithium diisobutyldi-1-(2-ethylhexyl) aluminate.

* * * * *

UNITED STATES PATENT OFFICE
CERTIFICATE OF CORRECTION

Patent No. 3,624,002  Dated November 30, 1971

Inventor(s) William Novis Smith, Jr.

It is certified that error appears in the above-identified patent and that said Letters Patent are hereby corrected as shown below:

In the heading on page 1, "Ex," should be --Exton--.

In Table II under the column headed "Alkylaluminum reactant"

"Tri-n-heyl-aluminum" should be -- Tri-n-hexyl-aluminum --
and
"Tri-n-buty-aluminum" should be -- Tri-n-butyl-aluminum --.

Claim 1, line 58 "[1-(2-alkyl-branched-" should be
--[di-1-(2-alkyl-branched- --.

Claim 18, line 2  "2-alkyl-branched)]" should be
-- 2-alkyl-branched-alkyl)] --.

Claim 20, line 6  Omit the word "with" after "alkanes".

Claim 22, line 3  "$LiR^1AlRBH2R^3$" should be
--$LiR^1AlR^1R^2R^3$--.

Signed and sealed this 30th day of May 1972.

(SEAL)
Attest:

EDWARD M.FLETCHER,JR.
Attesting Officer

ROBERT GOTTSCHALK
Commissioner of Patents